United States Patent [19]

Curlee, III et al.

[11] 4,388,688
[45] Jun. 14, 1983

[54] SHARED TOD CLOCK MODIFICATION BIT

[75] Inventors: Thomas O. Curlee, III; Ethel L. Richardson, both of Poughkeepsie, N.Y.

[73] Assignee: International Business Machines Corp., Armonk, N.Y.

[21] Appl. No.: 320,153

[22] Filed: Nov. 10, 1981

[51] Int. Cl.³ .................................. G06F 11/00
[52] U.S. Cl. .................................. 364/200; 371/61
[58] Field of Search ................ 364/200, 900; 371/61

[56] References Cited

U.S. PATENT DOCUMENTS

| | | | |
|---|---|---|---|
| 3,248,707 | 4/1966 | Paul et al. | 364/200 |
| 3,408,629 | 10/1968 | Haselwood | 364/900 |
| 3,761,884 | 9/1973 | Avan et al. | 364/200 |
| 3,932,847 | 1/1976 | Smith | 364/200 |
| 4,112,500 | 9/1978 | Peters | 364/900 |
| 4,121,286 | 10/1978 | Venton et al. | 364/200 |
| 4,349,890 | 9/1982 | Chang | 364/900 |

OTHER PUBLICATIONS

IBM TDB vol. 17, No. 7 Dec. 1974–pp. 2043–2045.

Primary Examiner—Felix D. Gruber
Assistant Examiner—Stuart D. Dwork
Attorney, Agent, or Firm—James E. Murray

[57] ABSTRACT

A shared time-of-day (TOD) clock modification bit is used in a multiprocessing system in which the timing facilities in two or more CPUs are implemented as a function of a single TOD clock. This bit helps avoid timer errors that occur as the result of one central processing unit (CPU) changing the TOD clock value while another CPU is executing an instruction which determines a CPU timer value. Whenever the microcode in any one of the CPUs reads the TOD clock, it obtains the Shared TOD Clock Modification Bit in addition to the TOD value. This bit indicates if the TOD clock read operation just completed is the first such operation executed by that CPU since the TOD clock was updated by another CPU sharing the same TOD clock. If it is, certain instructions take action to correct timer errors introduced by the change in the TOD clock value.

2 Claims, 7 Drawing Figures

SHARED TOD CLOCK MODIFICATION BIT

BACKGROUND OF THE INVENTION

The present invention relates to a multiprocessing system with a single time-of-day (TOD) clock and more particularly to a multiprocessing system in which timing facilities in two or more central processing units (CPUs) are implemented as a function of a single TOD clock.

In a multiprocessing system where two CPUs share a single hardware TOD clock, each CPU has the capability to read and set the shared TOD clock. In such a system the CPU timer, which is logically independent of the TOD clock, can be implemented in each CPU as a function of the TOD clock. To do this, each CPU maintains a parameter in local store which is calculated by adding a preselected amount to the reading on the TOD clock. The timer value can then be computed by subtracting a later reading of the clock from the local store parameter.

When one CPU executes the instruction Set Clock (SCK) which modifies the TOD Clock, the stored CPU timer parameter in both CPUs must be adjusted. Therefore, the issuing CPU not only sets the TOD clock but also subtracts the reading of the TOD clock before and after the modification to generate a TOD delta to be used in updating the stored CPU timer parameter in all CPUs sharing the same TOD Clock. The issuing CPU stores these TOD deltas in the shared processor section of main storage and then signals all CPUs of the TOD clock change via a CPU-to-CPU signaling mechanism. At the end of the current unit of operation (EOP), each CPU will execute a microprogram typically called the TOD Clock Change Handler routine which uses the TOD delta to update its CPU timer parameter to reflect the change in the TOD clock.

This scheme works except for the case when a CPU sharing the TOD clock with the CPU executing the SCK instruction is concurrently executing an instruction which uses a CPU timer value, such as Set CPU Timer (SPT) or Store CPU Timer (STPT). If, for example, a SCK instruction was being executed on one CPU concurrent with a STPT instruction on the other CPU, the second CPU might erroneously compute the CPU timer value by subtracting the new TOD value from a local store parameter based on the old TOD value. One way of solving the problem would be to employ a synchronization signalling scheme which would prevent the second CPU from reading the clock at an inappropriate time. This would be complicated and costly.

THE INVENTION

In accordance with the present invention, a shared TOD Clock Modification Bit is defined which minimizes the need for synchronization by allowing recovery from the situation, if it occurs. Whenever the microcode in any one of the CPUs reads the TOD clock, it obtains the Shared TOD Clock Modification Bit in addition to the TOD value. This bit indicates if the TOD clock read operation just completed is the first such operation executed by that CPU since the TOD clock was updated by another CPU sharing the same TOD clock. Most functions reading the TOD clock such as the microcode for the instruction Store Clock (STCK), ignore this bit. Other routines interrogate this hardware bit and take special action when it is active.

In the case of Store CPU Timer (STPT) instruction, the microcode interrogates the Shared TOD Clock Modification Bit. If this bit is active, computing the CPU timer value by subtracting the TOD clock value from the stored parameter will give erroneous results. To prevent this, the microcode will compute the CPU timer value by adding the TOD delta to the stored parameter and subtracting the updated TOD clock value. Following the completion of the STPT instruction, the microcode will update the CPU timer parameter in local store using the TOD clock change handler routine.

Similarly, if the TOD modification bit is on during the instruction Set CPU Timer (SPT) the local store CPU timer parameter is calculated by subtracting the TOD delta from the updated value of the TOD clock. Again, following completion of the SPT instruction microcode invokes the TOD Clock Change Handler to adjust the CPU timer parameter using the TOD delta.

Therefore, it can be seen the TOD Clock Modification bit provides a means for a CPU to recover any timing facilities which it maintains as a function of the TOD Clock (such as the CPU timer) when it cannot respond to a sharing CPU signal to change the stored parameter.

Therefore, it is an object of the present invention to correct potential timer errors in multiprocessing systems.

It is another object of the present invention to allow one CPU in a multiprocessing system to modify the TOD clock without that CPU synchronizing the operation with any other CPU sharing that TOD clock when both CPUs have used the TOD clock to implement other logically independent timing facilities.

THE DRAWINGS

These and other objects of the invention can best be understood by reference to the accompanying drawings of which:

ILLUSTRATED EMBODIMENT

Figure 1:
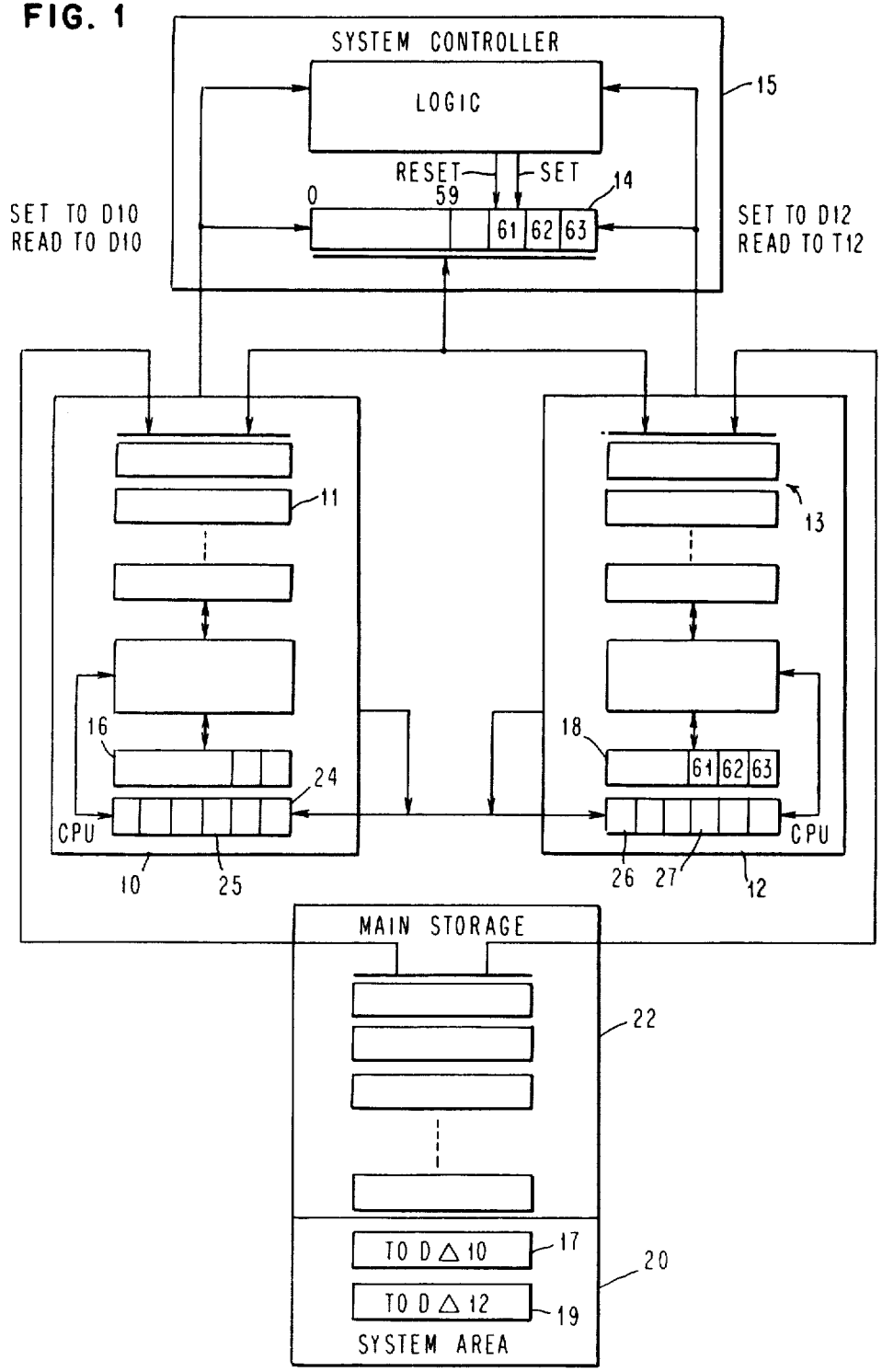
FIG. 1 is a block diagram of a multiprocessing system incorporating the present invention.

Referring to FIG. 1, two central processing units (CPU's) 10, 12 interface a common time of day (TOD) clock which is basically a counter whose count is kept in a register 14 located in the system controller (SC) 15. A description of the TOD clock format and its operation can be found beginning on page 4-18 in the IBM Manual #GA22-7000-61 file MOS370-01 entitled IBM System/370 Principles of Operation. It is sufficient to say here that in the present embodiment bits 0 to 59 of the register 14 contain the count of the clock while bits 61 to 63 are status bits which will be described hereinafter.

The CPU's 10 and 12 rely on the TOD clock in performing CPU timing functions. A CPU timing function is initiated through a particular CPU 10 or 12 by performing a Set CPU Timer (SPT) instruction which adds the CPU timer value to be set to the count of register 14 at the beginning of an operation to be timed to form a timer parameter and places this parameter in its respective local store 16 or 18. Thereafter, the timer value can be obtained by a store CPU timer (STCK) instruction which subtracts the count then in the TOD register 14 from the stored timer parameter to get the current timer value.

Both CPU 10 or 12 can perform instructions to set the time-of-day clock (SCK) and read the time-of-day clock (STCK). When the time-of-day clock is set, the CPU setting the time of day clock computes a TOD delta, which is the difference between the counts in register 14 prior to setting of the TOD clock and after setting of the TOD clock. This computed TOD delta is placed in dedicated locations 17 and 19 in the system area 20 of main storage 22. The CPU initiating the TOD change notifies both itself and its sister CPU of the fact that it has changed the TOD clock and it has stored the difference between present and previous values of the clock in the system area 20 of the main memory 22. This notification is accomplished by setting a bit 24 and 26 to "1" in the internal status registers 25 and 27 of processors 10 and 12 respectively.

Figure 2A:
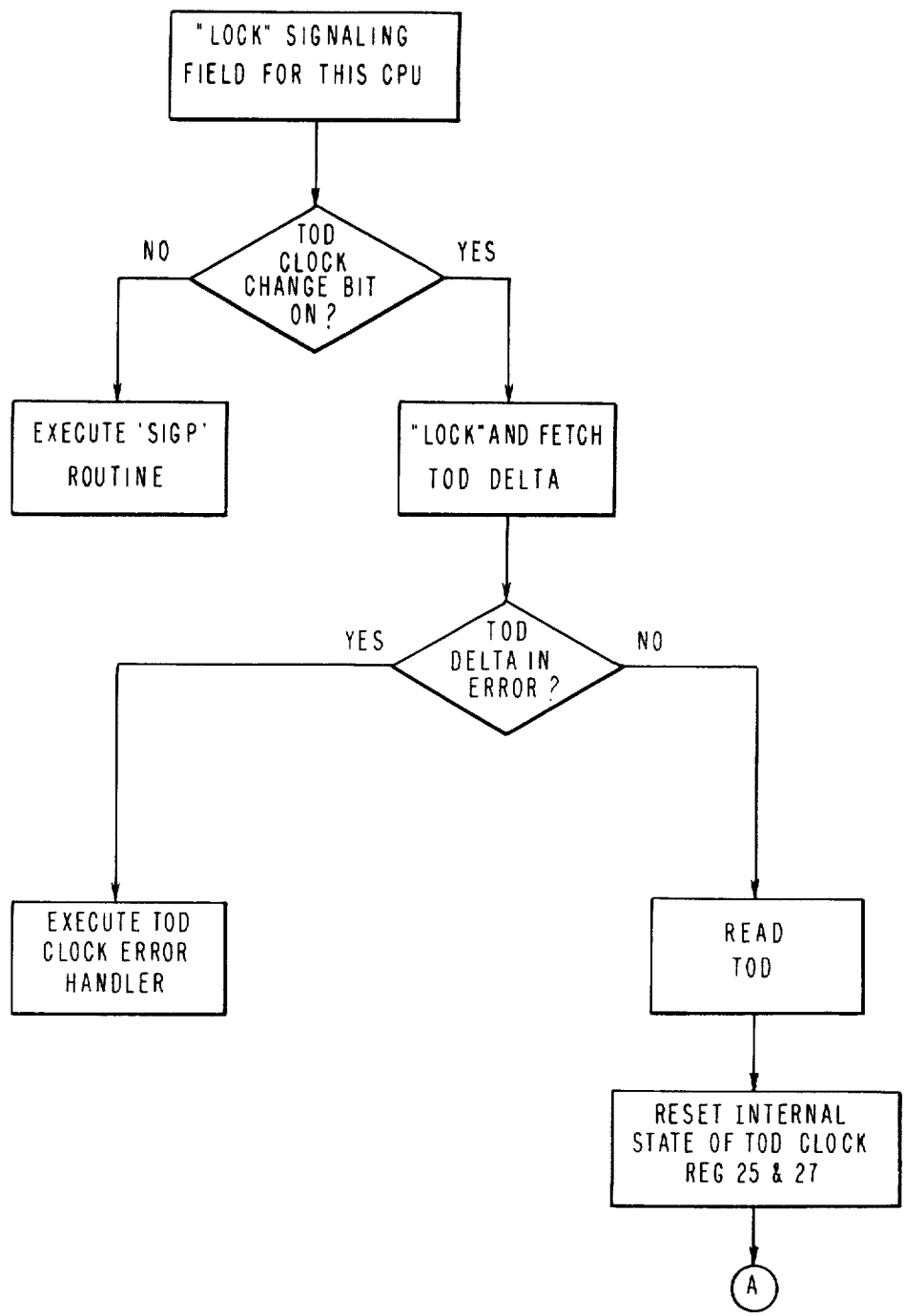
FIG. 2 is a flow diagram of microcode used in the TOD clock change handler routine.
Figure 2B:
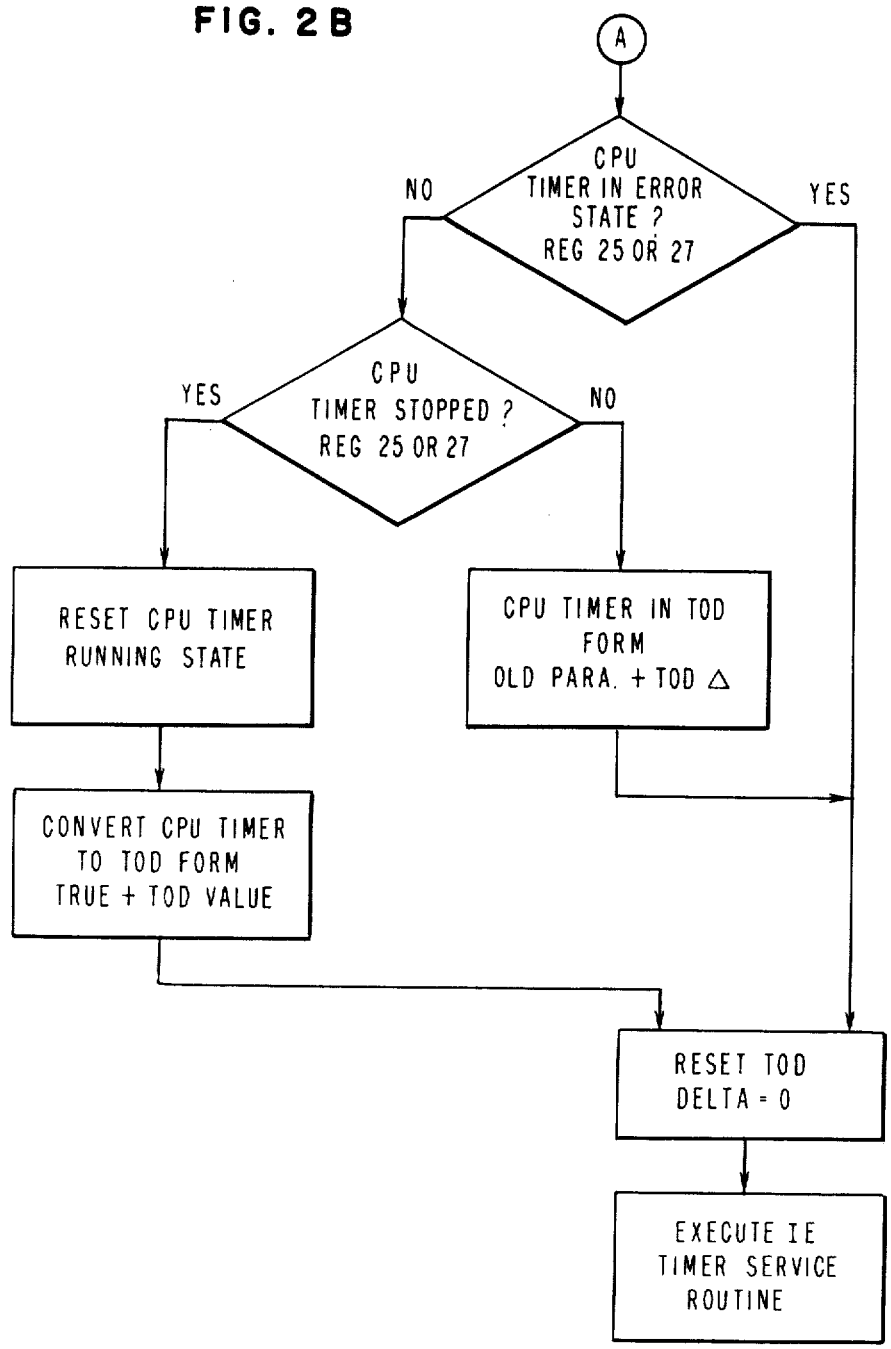

In each CPU the TOD change handler microcode shown in FIG. 2 is involved at the end of the next operation (EOP). The CPU goes to the system area of main memory, gets its TOD delta from the processor area 20 and uses it to compute a new CPU timer parameter by adding the TOD delta to the old CPU parameter. Bits 60 to 63 of the TOD delta are status bits. If bit 61 is equal to one it indicates the old TOD clock value is in error state.

This system works satisfactorily except for a few situations where a processor 10 performs a computation using the parameter prior to this update. As mentioned previously, this is significant in two program instructions SPT and STPT described in the above-mentioned manual. If either one of those instructions is being executed on one CPU 10 or 12 while the other CPU is performing a set TOD clock (SCK) instruction there is the possibility of an erroneous computation. This is because the CPU timer parameter stored in register 16 or 18 is based on the setting of the TOD clock prior to the SCK instruction and the TOD clock value newly obtained from register 14 is based on setting of the clock after the SCK instruction. The present invention is directed at eliminating this problem.

Figure 3:
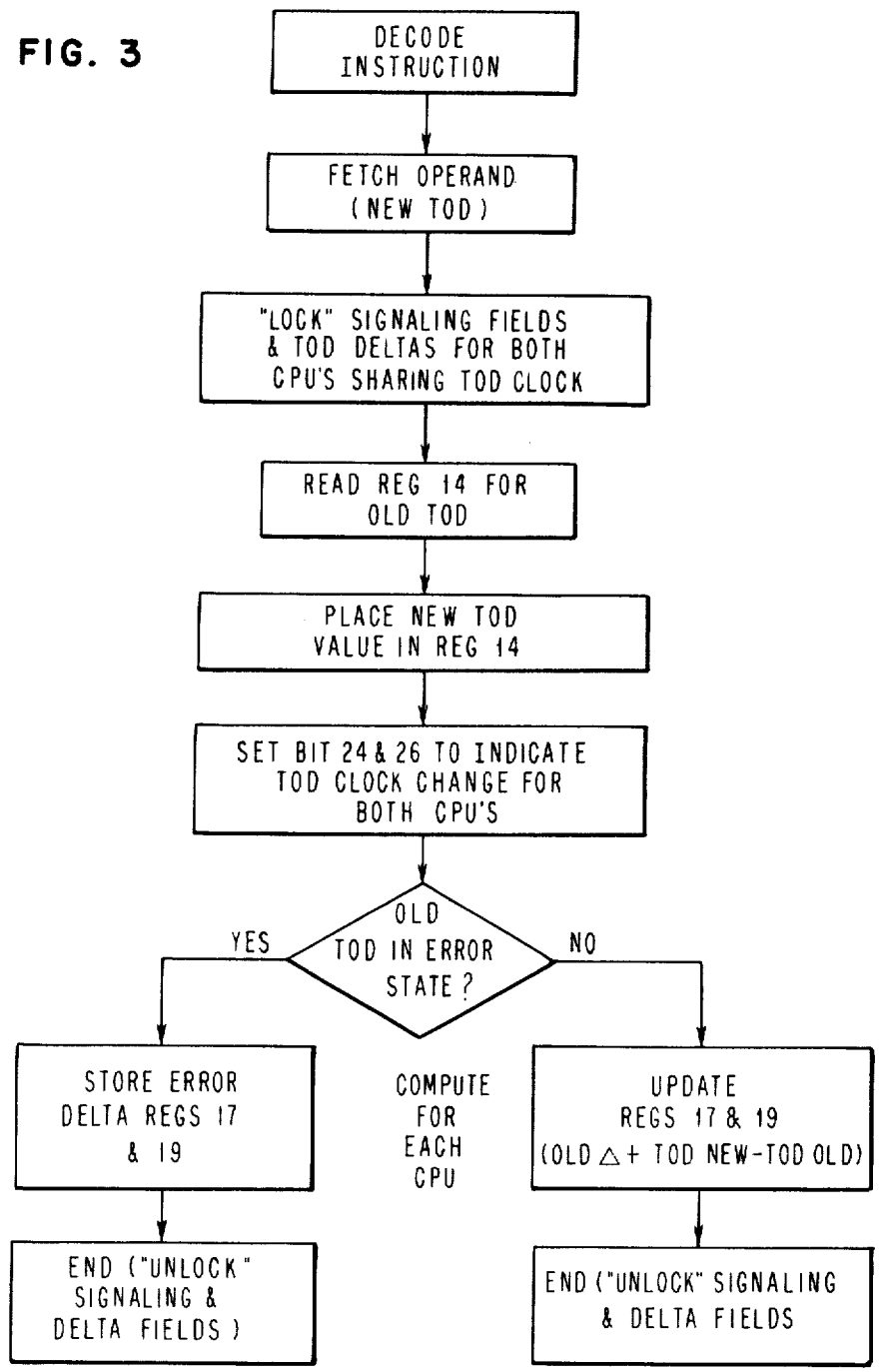
FIG. 3 is a flow diagram of microcode used in the Set TOD Clock (SCK) instruction.

When an SCK instruction is performed by processor 12, the current contents of register 14 are partially replaced by the contents of the double word location in main store identified in the operand of the instruction described on page 10-9 of the mentioned manual. A flow diagram of the microcode for the SCK instruction is shown in FIG. 3. In the loading of the new TOD value into register 14, a set TOD signal is sent to the register 14.

Figure 4:
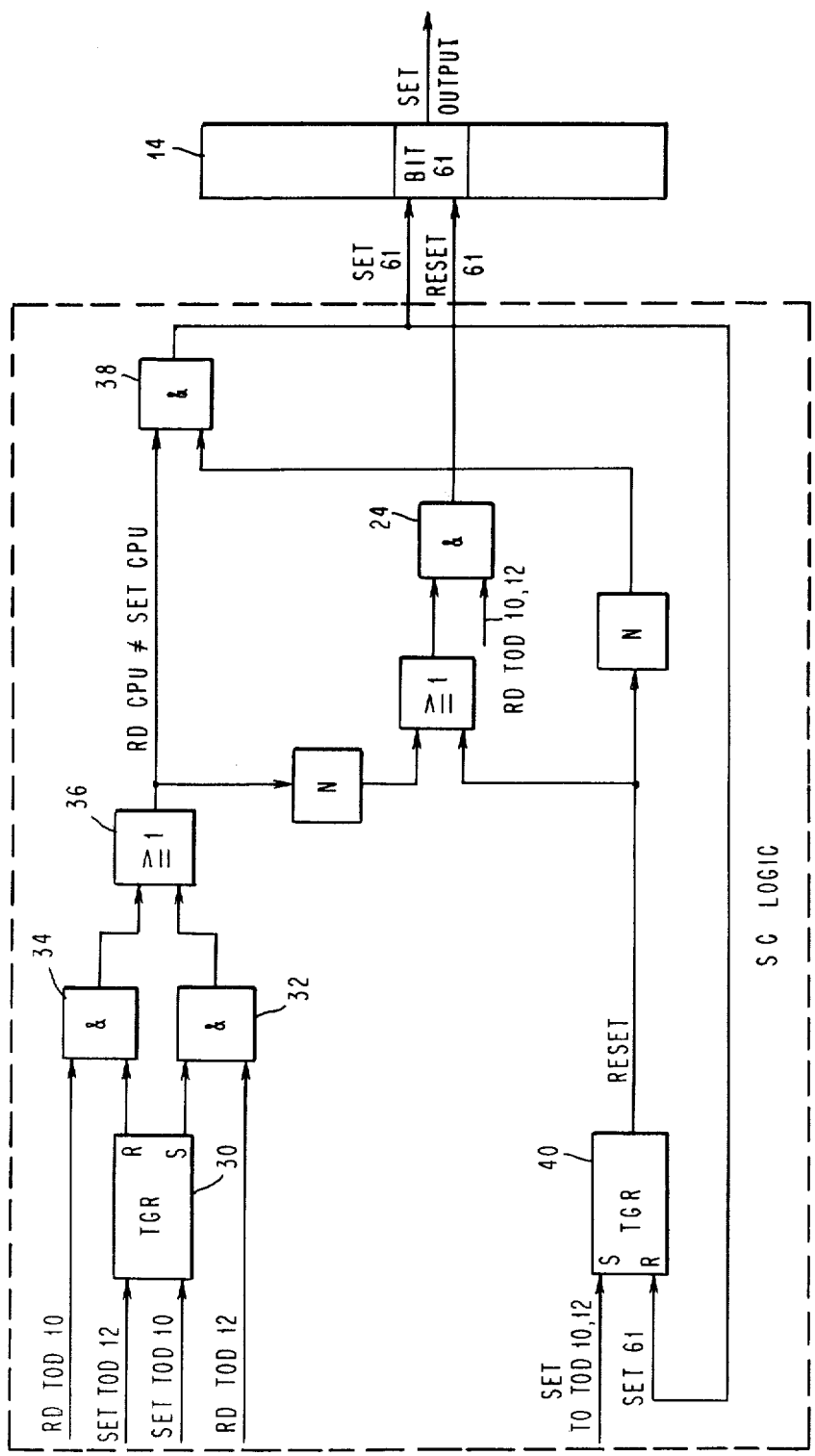
FIG. 4 is a logic diagram of logic in the system controller of FIG. 1.

This set TOD signal also controls the state of bit 61 of the register during the next read TOD operation. As shown in FIG. 4, a set TOD signal from CPU 10 sets trigger 30 while a set TOD signal from CPU 12 resets trigger 30. The set output of trigger 30 is fed into AND gate 32 with the read TOD signal of processor 12 and the reset of output trigger 30 is fed into AND gate 34 with the read TOD signal from processor 10. The outputs of the two AND gates 32 and 34 are ORed together in OR gate 36 so that the output of OR gate 36 is up when the processor reading the time of day clock is not the processor that last set the TOD clock (RD CPU≠SET CPU). The output of OR gate 36 is fed into AND gate 38 along with the output of trigger 40 which stores data on whether set bit 61 had been set since the last SCK instruction. If bit 61 has been set after a SCK instruction trigger 40 will be reset and the output of AND gate 38 will remain down irrespective to its RD CPU≠SET CPU input. However, if a bit 61 has not been reset since the last SCK instruction trigger 40 will be set and AND gate 38 will generate a set bit 61 signal when RD CPU≠SET CPU. This will set bit 61 in the TOD register 14. Bit 61 is reset on the next read TOD signal by AND gate 24 when the outputs of trigger 40 is up or OR gate 36 is down.

As can be seen, when either CPU 10 or 12 first reads the TOD register 14 after a set TOD signal from the other CPU, bit 61 in the register will have a value of 1; otherwise bit 61 will have a value of 0.

Besides storing the TOD count in bits 0 to 59 and the TOD clock modification bit in bit 61 the counter also has TOD status information in bits 62 and 63. A value of 00 in these two bit positions indicates the TOD clock is in error. A value of 01 indicates the TOD clock is not set. A value of 10 indicates the TOD clock is stopped and a value of 11 indicates that the TOD clock is set.

Status registers 25 and 27 contain one bit indicating the TOD clock is in error if it is "1". They also contain two bits which indicate the status of the CPU timer. One of these bits indicates the CPU timer is in the stopped state when it is "1" and the other of the status bits indicates the CPU timer is in the error state when it is "1". If the CPU timer is in the error state the TOD parameter value will be zero. If the CPU timer is in the stopped state the value of the timer will be in true form. That is the timer parameter will be the value obtained at the operand address of the SPT instruction. If the CPU timer is in neither the error or stopped states it will be in TOD form or, in other words, the stored parameter will be equal to the operand value of the SPT instruction plus the count in the TOD register 14 when the SPT instruction was executed.

Figure 5:
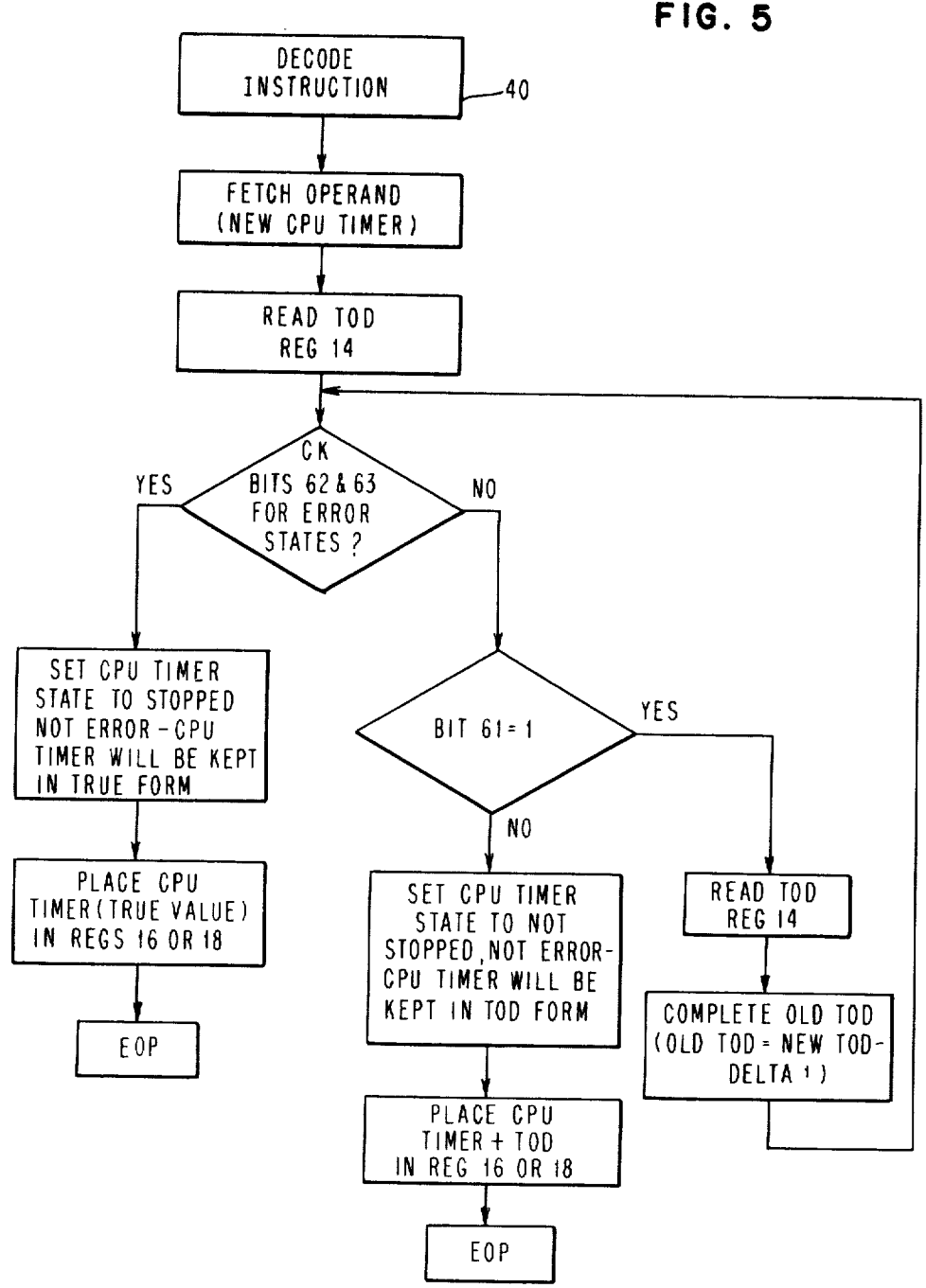
FIG. 5 is a flow diagram of microcode used in the set CPU clock (SPT) instruction.

The various status bits mentioned above are used by the microcode in performing instruction execution including the SPT and STPT instructions. Details of the SPT and STPT instructions can be found in the above-mentioned manual on pages 10-10 and 10-15 respectively. FIG. 5 is a flow diagram of the SPT instruction microcode. When SPT instruction is decoded and the current TOD value is fetched from register 14 status bits 62 and 63 of the TOD clock are read to determine if the TOD clock is in an error state. If the TOD clock is in an error state the true value of the CPU timer is stored in register 16 and the operation is ended. If the clock is not in the error state the TOD modification bit 61 is examined. If this bit is "0" the value of the TOD clock is added to the fetched operand and stored in register 16 and the operation ended. If the TOD modification bit 61 is "1" the TOD delta is obtained from main storage and subtracted from the contents of the TOD register 14 to give the TOD time prior to the SCK instruction. This "old" time is added to the "true" value of the CPU timer and stored in the register 16 or 18 as the TOD parameter. After SPT instruction has been completed the TOD clock change handler microcode shown in FIG. 2 will update the TOD parameter to reflect the change in the TOD as a result of the concurrent SCK instruction.

Figure 6:
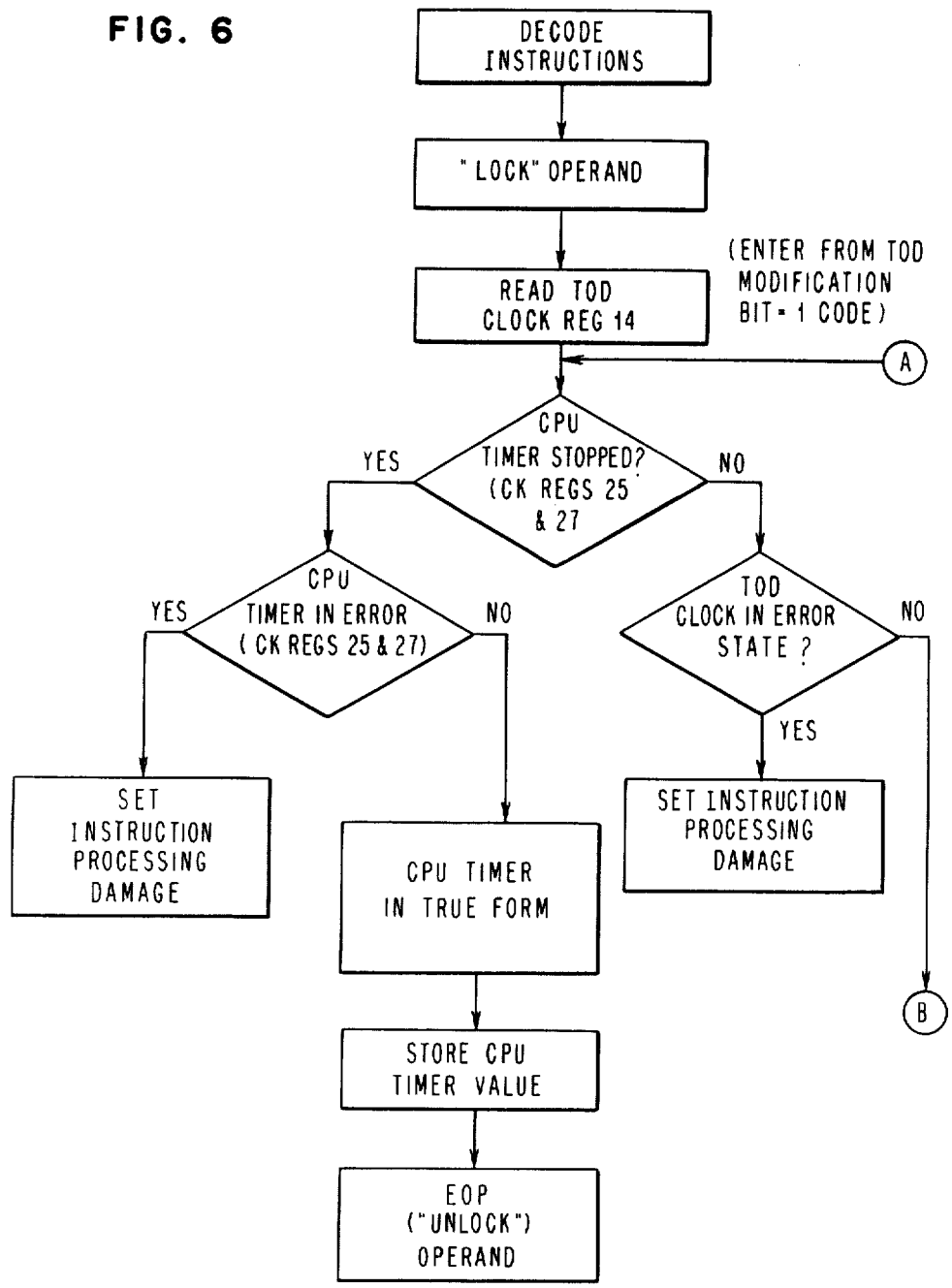
FIG. 6 is a flow diagram of microcode used in the store CPU clock (STPT) instruction.
Figure 7:
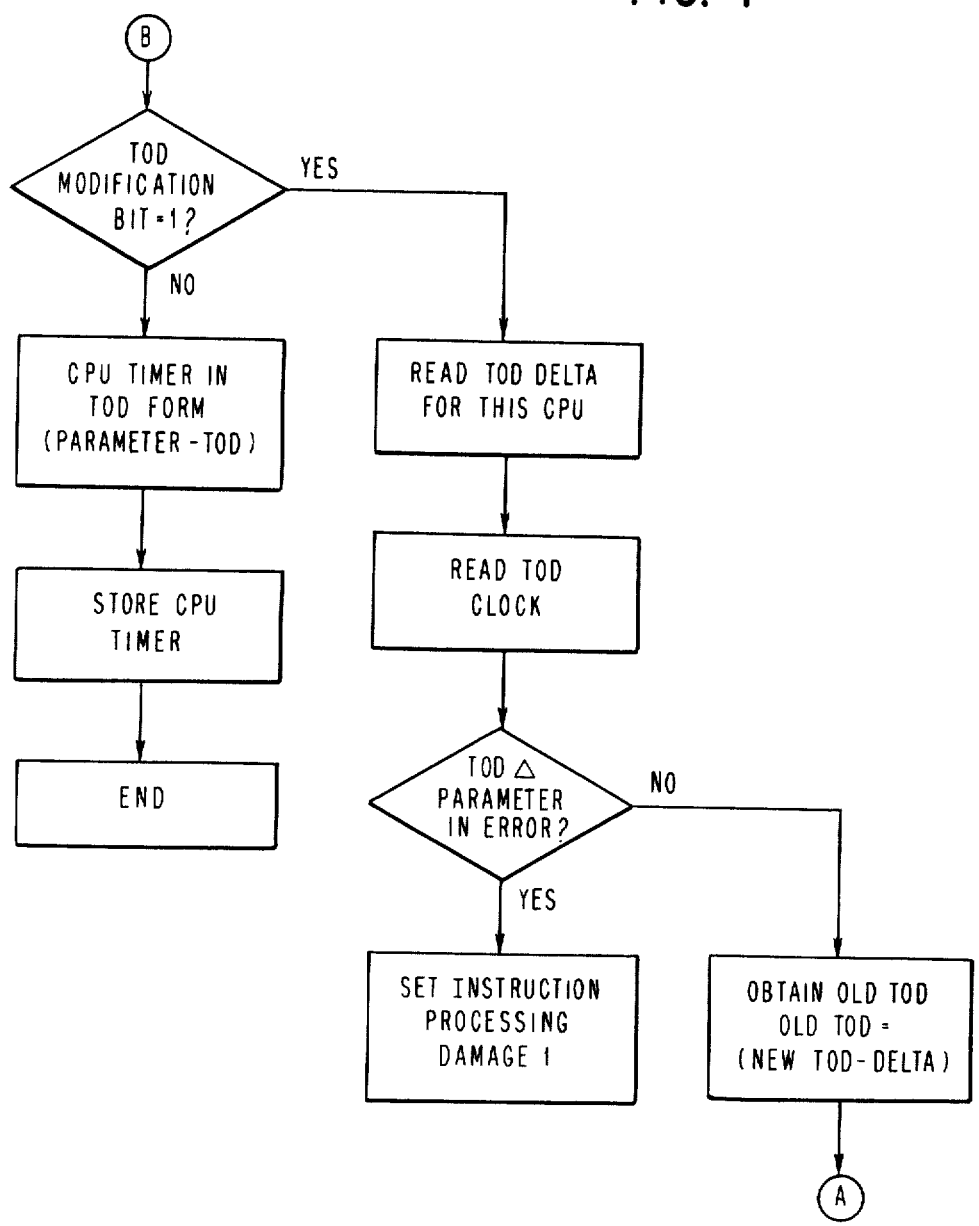

In the STPT instruction microcode shown in FIG. 6, the process involves adding the delta to the stored parameter when bit 61 is "1" to correct the error in the CPU timer value introduced by the concurrent SCK instruction. After the STPT instruction is complete the timer parameter will be updated for future reference.

Thus, it can be seen that it is possible to make the adjustment necessary for the CPU timer without additional synchronization between the CPU's 10 and 12.

It should be understood that many modifications and changes can be made in the illustrated embodiment without departing from the spirit and scope of the invention as represented in the attached claims.

Having thus described our invention, what we claim as new, and desire to secure by Letters Patent is:

1. In a computer which has a TOD clock count maintained in a register that is shared by at least two processors where each processor implements a timer function by subtracting a stored count from a count of the TOD clock register and where at least one processor is capable of changing the TOD count in the register by instruction and at the completion of the instruction updating the stored counts for the processor, a method for correcting errors introduced into the timer calculations of the other processor by a concurrently occurring change in the TOD clock count made by said one processor;

storing one type of binary manifestation as a status signal in said register along with the TOD count each time the TOD clock is changed by said one processor which is changing the TOD count;

supplying said one type of binary manifestation to said other processor only the first time it interrogates said register after said register has been modified by said first processor;

modifying the first occurring timer calculation of said other processor by a stored difference signal which reflects the magnitude of any error which exists in the timer calculation as a result of said changing of the TOD clock count.

2. A method of correcting all errors introduced into timer calculations of two processors which implement timer calculations by subtracting a stored count maintained separately by each processor from a TOD clock count maintained in a shared TOD register when one processor changes the TOD count in said TOD register comprising:

storing the difference between the TOD clock counts before and after it has been changed by the one processor, storing one type of binary manifestation as a status signal in said TOD register along with the TOD count when the TOD count is changed by said one processor, updating the stored counts in both processors to reflect the change in the TOD clock prior to the start of the next operation of each processor by subtracting the difference stored previously from the stored counts, changing the difference stored to zero after the stored counts in both processors have been updated to reflect the updated condition of the stored counts, modifying the first timer calculation of the other processor to occur after the storing of the one manifestation by subtracting the difference count stored from the calculation to prevent errors in timer calculations in said other processor which occurred concurrently with the change in the TOD count, and changing the status signal to another binary manifestation to reflect the fact that the TOD clock has not been changed since the last timer calculation of the other processor.

* * * * *